United States Patent
Pan et al.

(10) Patent No.: US 10,607,463 B2
(45) Date of Patent: Mar. 31, 2020

(54) AUTOMATED OBJECT AND ACTIVITY TRACKING IN A LIVE VIDEO FEED

(71) Applicant: THE BOEING COMPANY, Chicago, IL (US)

(72) Inventors: Jan Wei Pan, Madison, AL (US); Yuri Levchuk, Potomac, MD (US); Zachary Jorgensen, Owens Cross, AL (US)

(73) Assignee: The Boeing Company, Chicago, IL (US)

( * ) Notice: Subject to any disclaimer, the term of this patent is extended or adjusted under 35 U.S.C. 154(b) by 87 days.

(21) Appl. No.: 15/374,463

(22) Filed: Dec. 9, 2016

(65) Prior Publication Data

US 2018/0165934 A1    Jun. 14, 2018

(51) Int. Cl.
| | |
|---|---|
| G06K 9/00 | (2006.01) |
| G08B 13/196 | (2006.01) |
| G11B 27/031 | (2006.01) |
| G11B 27/28 | (2006.01) |
| G06F 17/28 | (2006.01) |
| G06K 9/66 | (2006.01) |
| G10L 13/08 | (2013.01) |

(52) U.S. Cl.
CPC ....... G08B 13/19691 (2013.01); G06F 17/28 (2013.01); G06K 9/00718 (2013.01); G06K 9/00771 (2013.01); G06K 9/66 (2013.01); G08B 13/19613 (2013.01); G10L 13/08 (2013.01); G11B 27/031 (2013.01); G11B 27/28 (2013.01); G06K 2009/00738 (2013.01)

(58) Field of Classification Search
None
See application file for complete search history.

(56) References Cited

U.S. PATENT DOCUMENTS

| | | | |
|---|---|---|---|
| 2008/0312010 A1* | 12/2008 | Marty | A63B 24/0003 473/447 |
| 2009/0087085 A1 | 4/2009 | Eaton et al. | |
| 2011/0052000 A1 | 3/2011 | Cobb et al. | |

(Continued)

FOREIGN PATENT DOCUMENTS

| | | | |
|---|---|---|---|
| WO | 2009/079809 | 7/2009 | |
| WO | 2010/117213 | 10/2010 | |
| WO | WO 2010117213 A2 * | 10/2010 | ............. G06Q 30/00 |

OTHER PUBLICATIONS

Xu et al., " Show, Attend and Tell: Neural Image Caption Generation with Visual Attention", arXiv:1502.03044v3, Apr. 2016, 22 pgs.

(Continued)

*Primary Examiner* — Delomia L Gilliard
(74) *Attorney, Agent, or Firm* — Womble Bond Dickinson (US) LLP

(57) ABSTRACT

An apparatus is provided for automated object and activity tracking in a live video feed. The apparatus receives and processes a live video feed to identify a plurality of objects and activities therein. The apparatus also generates natural language text that describes a storyline of the live video feed using the plurality of objects and activities so identified. The live video feed is processed using computer vision, natural language processing and machine learning, and a catalog of identifiable objects and activities. The apparatus then outputs the natural language text audibly or visually with a display of the live video feed.

18 Claims, 4 Drawing Sheets

(56) References Cited

U.S. PATENT DOCUMENTS

| | | | |
|---|---|---|---|
| 2015/0248917 A1* | 9/2015 | Chang | H04N 21/8549 386/282 |
| 2017/0255829 A1* | 9/2017 | Chang | G06K 9/00724 |
| 2017/0289624 A1* | 10/2017 | Avila | H04N 21/4542 |

OTHER PUBLICATIONS

Zhu et al., "Uncovering Temporal Context for Video Question and Answering", arXiv:1511.04670v1, Nov. 2015, 10 pgs., SCS, Carnegie Mellon University, QCIS, University of Technology Sydney.

Antol et al., "VQA: Visual Question Answering", International Conference on Computer Vision, 2015, 9 pgs.

Ba et al., "Learning Wake-Sleep Recurrent Attention Models", In Advances in Neural Information Processing Systems, 2015, 9 pgs.

Badrinarayanan et al., "SegNet: A Deep Convolutional Encoder-Decoder Architecture for Image Segmentation", arXiv preprint arXiv:1511.00561v2 , Dec. 2015, 14 pgs.

Chang et al., "Dynamic Concept Composition for Zero-Example Event Detection", Association for the Advancement of Artificial Intelligence, 2015, pp. 3464-3470.

Fang et al., "From Captions to Visual Concepts and Back", Proceedings of the IEEE Conference on Computer Vision and Pattern Recognition, 2015, 10 pgs.

Hong et al., "Decoupled Deep Neural Network for Semi-supervised Semantic Segmentation", arXiv:1506.04924v2, Jun. 2015, 9 pgs.

Karpathy et al., "Deep Visual-Semantic Alignments for Generating Image Descriptions", Stanford University, 2015, 17 pgs.

Ma et al., "Learning to Answer Questions From Image Using Convolutional Neural Network", Huawei Technologies, arXiv:1506.00333v2, Nov. 2015, 8 pgs.

Ren et al., "Faster R-CNN: Towards Real-Time Object Detection with Region Proposal Networks", Advances in neural information processing systems, Jan. 2016, 14 pgs.

Ren et al., "Exploring Models and Data for Image Questions Answering", Advances in Neural Information Processing Systems, 2015, 9 pgs.

Russakovsky et al., "ImageNet Large Scale Visual Recognition Challenge", arXiv:1409.0575v3, Jan. 2015, 43 pgs.

Stollenga et al., "Deep networks with internal selective attention through feedback connections." Advances in Neural Information Processing Systems. 2014, 9 pgs., Manna-Lugano, Switzerland.

Sukhbaatar et al., "End-to-end memory networks", Advances in neural information processing systems. 2015, 11 pgs., New York.

Tapaswi et al., "MovieQA: Understanding stories in movies through question-answering", arXiv:1512.02902, 2015, 17 pgs.

Venugopalan et al., "Translating videos to natural language using deep recurrent neural networks", Human Language Technologies: The 2015 Annual Conference of the North American Chapter of the ACL, 2015, pp. 1494-1504, Denver, Colorado.

Extended European Search Report dated Apr. 20, 2018 in corresponding European Application No. 17203852.3.

* cited by examiner

AUTOMATED OBJECT AND ACTIVITY TRACKING IN A LIVE VIDEO FEED

TECHNOLOGICAL FIELD

The present disclosure relates generally to object and activity tracking and, in particular, to tracking and describing a storyline of objects and activities within a live video feed.

BACKGROUND

Currently, there is an increasing demand for more sophisticated video surveillance systems. This demand is primarily motivated by organizations looking to use surveillance videos to not only enhance security capabilities, but also to increase situational awareness for improving their business operations. For example, retailers and customer-facing branch network operators utilize insights from videos to optimize their operations and better understand customer behaviors. In another example, airports, train stations and other mass transit operators monitor videos to facilitate human traffic flow, detect operational incidents, and use predictive modeling to optimize their operations.

With this rapid increase in the installation of video surveillance systems, existing teams of operators for the surveillance systems are unable to efficiently process and maintain the vast quantity of video data that is being generated, which may lead to a substantial amount of unseen video footage. As a result, most video surveillance installations are only used for forensic and evidential purposes after the fact. To maximize insights relevant to the video surveillance footage, human analysts are heavily utilized to monitor videos for activities such as suspicious behavior, object recognition, traffic monitoring, incident detection, face matching, safety alerts, anomaly detection, and crowd counting. This manual use of video processing is effectively inefficient and error prone.

Therefore, it may be desirable to have a system and method that take into account at least some of the issues discussed above, as well as possibly other issues.

BRIEF SUMMARY

Example implementations of the present disclosure are directed to an improved apparatus, method and computer-readable storage medium for automated object and activity tracking in a live video feed. In some example implementations, a method is provided for automated object and activity tracking in a live video feed. The method comprises receiving a live video feed. The method also comprises processing the live video feed to identify a plurality of objects and activities therein, and to generate natural language text that describes a storyline of the live video feed using the plurality of objects and activities so identified. The live video feed is processed using computer vision, natural language processing and machine learning, and a catalog of identifiable objects and activities. The method also comprises outputting the natural language text audibly or visually with a display of the live video feed.

In some example implementations of the method of the preceding or any subsequent example implementation, or any combination thereof, the method further comprises maintaining the catalog of identifiable objects and activities using the machine learning, including updating corresponding objects and activities in the catalog with attributes of at least some of the plurality of objects and activities.

In some example implementations of the method of any preceding or any subsequent example implementation, or any combination thereof, the method further comprises receiving user input specifying an object of interest or an activity of interest, processing the live video feed to further identify the object of interest or the activity of interest in the plurality of objects and activities, and spatiotemporally tracking the object of interest in the live video feed, or generating an alert to indicate identification of the activity of interest in the live video feed.

In some example implementations of the method of any preceding or any subsequent example implementation, or any combination thereof, generating the natural language text includes filtering the natural language text and thereby the storyline to relate only to the object of interest or the activity of interest.

In some example implementations of the method of any preceding or any subsequent example implementation, or any combination thereof, processing the live video feed further includes generating a corresponding database of information describing the plurality of objects and activities, and the method further comprises receiving user input specifying a request for information regarding at least one object or activity of the plurality of objects and activities. In response thereto, the method comprises querying the database based on the request, and generating and outputting for display, natural language text responsive to the request.

In some example implementations of the method of any preceding or any subsequent example implementation, or any combination thereof, processing the live video feed to identify the plurality of objects and activities includes predicting a future outcome of interest based on identification of at least two predefined objects or activities from the plurality of objects and activities, and generating an alert to indicate the future outcome of interest so predicted.

In some example implementations of the method of any preceding or any subsequent example implementation, or any combination thereof, predicting the future outcome of interest includes identifying at least one of the at least two predefined objects or activities within a current frame of the live video, and another of the at least two predefined objects or activities within the current frame or a subsequent frame of the live video.

In some example implementations, an apparatus is provided for automated object and activity tracking in a live video feed. The apparatus comprises a processor and a memory storing executable instructions that, in response to execution by the processor, cause the apparatus to implement a number of subsystems, such as a receiver, identifier, and text generator that are configured to at least perform the method of any preceding example implementation, or any combination thereof.

In some example implementations, a computer-readable storage medium is provided for automated object and activity tracking in a live video feed. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
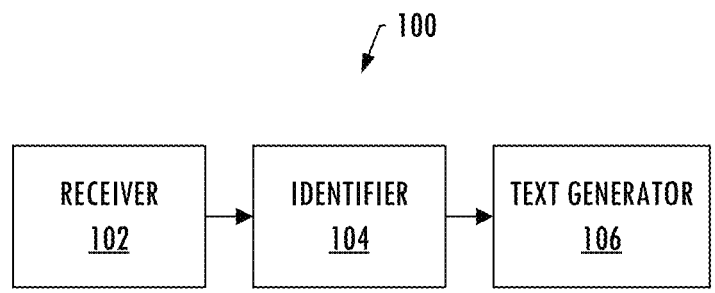
FIG. 1 is an illustration of a system for automated object and activity tracking in a live video feed, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more if not all of these may be absolute or approximate to account for acceptable variations that may occur, such as those due to engineering tolerances or the like Like reference numerals refer to like elements throughout.

Example implementations of the present disclosure are generally directed to object and activity tracking and, in particular, to tracking and describing a storyline of objects and activities within a live video feed. Example implementations will be primarily described in conjunction with applications for video surveillance and analytic systems. It should be understood, however, that example implementations may be utilized in conjunction with a variety of other applications, such as other applications within the aerospace industry and outside of the aerospace industry.

Example implementations of the present disclosure are more particularly directed to a system configured to receive video feed (e.g., via a video camera), and trained to automatically recognize various objects and activities present in the video feed, using a combination of computer vision, natural language processing, and machine learning models. The system is configured receive user input or queries specified by a human operator and, in response, infer the objects or activities of interest to the human. Further based on the user queries, the system is configured to automatically focus its identification process on the objects and activities of interest for tracking and alert purposes. The system also generates real-time comprehensible storylines that describe the observed or identified objects and activities by tracking their spatiotemporal relations across multiple frames of the video feed.

FIG. 1 illustrates a system 100 for automated object and activity tracking in a live video feed, which may simply be referred to as the "system" herein. The system is configured to perform a number of different functions or operations, either automatically, under direct operator control, or some combination of thereof. In some examples, the system is configured to perform one or more of its functions or operations automatically, that is, without being directly controlled by an operator. Additionally or alternatively, in some examples, the system is configured to perform one or more of its functions or operations under direct operator control.

In accordance with example implementations of the present disclosure, the system 100 is configured to perform various functions or operations to track objects and activities within a live video feed, and generate a storyline describing the objects and activities. In some example implementations, the system is configured to receive and process a live video feed. In these example implementations, the system is configured to process the live video feed to identify a plurality of objects and activities therein, and to generate natural language text that describes a storyline of the live video feed using the plurality of objects and activities so identified. The live video feed is processed using computer vision, natural language processing and machine learning, and a catalog of identifiable objects and activities.

The system is then configured to output the natural language text audibly or visually with a display of the live video feed.

The system 100 may include one or more of each of a number of different subsystems (each an individual system) coupled to one another for performing one or more functions or operations. As shown in FIG. 1, in some examples, the system includes a receiver 102, identifier 104, and text generator 106 coupled to one another. Although shown as part of the system, the receiver, identifier or text generator may instead be separate from but in communication with the system. It should also be understood that either of the subsystems may function or operate as a separate system without regard to others of the subsystems. And further, it should be understood that the system may include one or more additional or alternative subsystems than those shown in FIG. 1.

As explained in greater detail below, the receiver 102, identifier 104 and text generator 106 are configured to perform respective functions or operations of the system 100. In some implementations, the receiver is configured to receive a live video feed. In some examples, a user specifies the source of the live video for receipt by either a live stream link or a video file. The identifier is configured to process the live video feed to identify a plurality of objects and activities therein. As discussed herein the receiver and text generator may be operatively coupled to each other to function as a video-to-text (or captioning) engine, and the identifier and text generator may be operatively coupled to each other to function as an end-to-end query and response engine. The receiver functions as an initial processing unit, which receives a live video stream or video file as input and splits the live video into individual image frames.

To initially process a live video feed, the receiver 102 is configured to extract frames from video at a rapid pace. In some examples, the pace at which the videos frames are extracted is relevant to an allowable data transmission bandwidth of the system. The identifier 104 then identifies or recognizes different regions and objects of interest within the frame. Upon identification, the text generator 106 produces one or more natural language text strings describing the different regions and objects of interest within the frame that are recognizable by the system. The text strings are then fed into a query engine of the identifier to determine the best matching answer or response for user-initiated queries.

As indicated above, the live video feed is processed using computer vision, natural language processing and machine learning, and a catalog of identifiable objects and activities. Before the identifier 104 and text generator 106 are utilized, they require a one-time training process. The inputs to the training process consist of a set of video frames and corresponding captions in which each image-caption pair constitutes one training instance which, in some examples, a large number of domain-appropriate training instances are prepared by a human expert.

The training instances are used to tune the weights of the neural networks, using a back-propagation algorithm, for example. In some implementations, the identifier 104 is trained by machine learning techniques, such as deep learning neural networks or other suitable methods, to automatically detect attributes of objects and activities. The identifier may also be trained with both visual features and linguistic inputs, such as texts, speeches, and the like, such that it becomes capable of automatically interpreting and describing, in real-time, video scenes in linguistic outputs (e.g., text and speech). For training purposes, in some examples, the system is configured to maintain the catalog of identifiable objects and activities using the machine learning. This may include, for example, updating the corresponding objects and activities in the catalog with attributes of at least some of the plurality of objects and activities.

In some examples, the training process includes each extracted frame being processed using a neural network (e.g., a convolutional neural network) that produces a matrix of appearance features for different regions of the frame. In these examples, the matrix is passed into another convolutional neural network that selects a predetermined number of frame regions (regions of interest) which may be specified based on the user input, and outputs three matrices containing coordinates for the selected regions (four per region). The convolutional neural network also outputs a probability for each region that indicates the likelihood that the corresponding region is of interest, and a set of features for each region, respectively. The features for the regions of interest are then passed into a pair of fully connected neural network layers that produce a compact, fixed-sized encoding of the features for each region which result in a stacked matrix. The stacked matrix is passed into a language model that is constructed from a recurrent neural network (e.g., Long Short Term Memory Network (LSTM)).

Further in these examples, the visual features for the frame regions are input into the recurrent neural network and a token (e.g., a word) is sampled. The sampled token is then input into the LSTM and another token is sampled, and this process continuously loops until an end token is produced. The series of sampled words form sentential descriptions, or captions, of the regions. In a more particular example, the identifier 104 is configured to detect and recognize object and activities (e.g., humans and objects) that have been previous identified. The identifier is also configured to analyze the spatial distances between the objects and activities within the regions of interest, match those object and activities with the natural language text descriptions that it have been previously sampled, and output sentential descriptions that are determined to be best matching with the regions of interest.

The sequential descriptions, along with the coordinates of the corresponding regions of interest are stored in memory for use in providing responses to queries received by the human user. However, only generated descriptions, which correspond to frames that significantly differ from the previous frame, will be stored in memory. For example, if a description is not sufficiently different from a description generated from the previous frame it will be rejected and not stored in memory. In some alternative examples, a separate engine is configured to assess the difference image between successive frames and only processes frames that are sufficiently different from the previous frame. Furthermore, only a predetermined number of descriptions are stored in memory such that when the memory becomes full, the oldest descriptions are purged from the memory to allocate storage space for newer descriptions.

In some examples, each sentential description is given an identification number and stored in memory with others previously generated descriptions. The entire set of descriptions are converted into fixed-size memory vectors which is computed by embedding each description in a continuous space. These steps form an embedding matrix that represents the entire set. The sequential descriptions are then written to the memory up to a fixed buffer size, which can be predefined by a default setting or by the user from the system graphical user interface (GUI).

Figure 2:
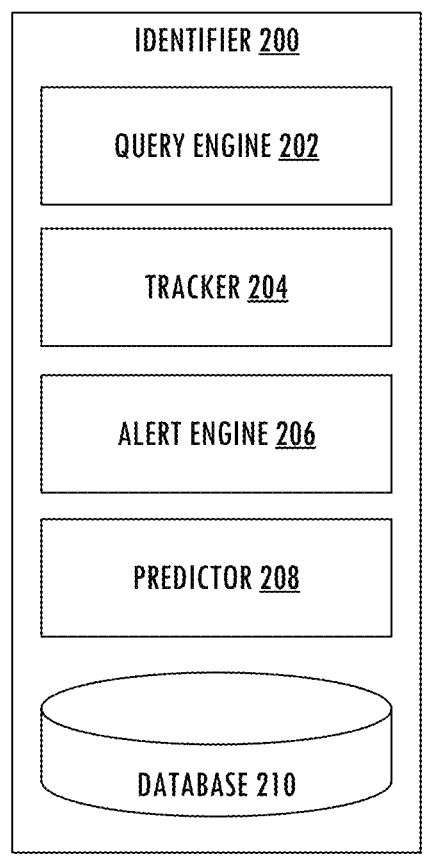
FIG. 2 illustrates a suitable identifier of FIG. 1, according to some example implementations.

FIG. 2 illustrates a suitable example of an identifier 200 that may in some examples correspond to the identifier 104 of FIG. 1. As shown, in some implementations, the identifier includes a query engine 202, tracker 204, alert engine 206, predictor 208 and database 210 coupled to one another for performing one or more functions or operations to process and analyze the live video feed. In some examples, the query engine is configured to receive user input that specifies an object of interest or an activity of interest, and process the live video feed to further identify the object of interest or the activity of interest in the plurality of objects and activities. In these examples, the tracker is configured to spatiotemporally track the object of interest in the live video feed. In some examples, the tracker is configured to track the spatial and temporal information for each of the plurality of objects and activities within the catalog independent of the object or activity being of interest. Further in the examples, the alert engine is configured to generate an alert to indicate identification of the activity of interest in the live video feed.

In some examples, the identifier 200 is configured to process the live video feed to generate a corresponding database 210 of information that describes the plurality of objects and activities. In these examples, the query engine 202 is configured to receive user input that specifies a request for information regarding at least one object or activity of the plurality of objects and activities, and query the database based on the request. For example, the user can submit a query that includes open-ended, free-form, natural language questions about the live video feed. These questions may further indicate where the identifier 200 should focus the analytical and recognition resources of the system. Based on this specified analysis, the system can generate a natural language answer or a warning message that is relevant to the user's questions or interests. In some examples, the user input is further utilized as a means to train the identifier 200 for automated recognition of objects and activities of interest to the user. For instance, in one example, the query engine is trained based on combinations of user input and corresponding responses such that upon receiving a user input, the query engine is configured to infer the correct response as opposed to querying the database based on the request.

In some examples, the identifier 200 is configured to process the live video feed to predict a future outcome. In particular, the predictor 208 is configured to predict a future outcome of interest based on identification of at least two predefined objects or activities from the plurality of objects and activities. This may include, for example, identifying at least one of the at least two predefined objects or activities within a current frame of the live video, and another of the at least two predefined objects or activities within the current frame or a subsequent frame of the live video. In response, the alert engine 206 is configured to generate an alert to indicate the future outcome of interest so predicted. For example, in response to detecting or predicting any suspicious behavior or anomalies that are relevant to the plurality of objects and activities identified within the live video, the alert engine may rapidly transmit warning messages to users through interfaces such as electronic mail, graphical user interfaces of the display and the like.

In a more particular example, a human user queries a question q, and selects objects or activities of interest by clicking on the objects or activities of interest with a mouse. The user may also specify a duration of interest. The query engine then embeds the query and other inputs into another matrix B. In this matrix, the question is defined by an internal state vector. A match is performed between the internal state vector and the memory of the stored $i^{th}$ description, $m_i$, by taking the inner product followed by a multinomial logistic regression (e.g., softmax regression). These steps form a continuous representation for both the sequential description x and q in the probability form, $p_i$, which is also considered as the probability of match formed over the descriptions.

Further, in these examples, a multi-step mechanism is applied in which the continuous representation is processed by multiple computational hops to determine answers that best match the set of inputs given by the user. In some examples, the system is trained by backpropagation to perform the computational steps automatically. The number of step computations are supported by stacking multiple layers of memory embedding matrix and another corresponding matrix. These layers are formed such that the sum of the output and the input, from the query, forms the next layer of input. The system then predicts the best match answer. This final prediction is generated by the sum of an output vector and the input query internal state through a computed attention weight matrix and a multinomial logistic regression (e.g., softmax regression). The attention weight matrix is formed during training process, such as a back-propagation algorithm, as described above. In some examples, system learns from sufficient domain-specific training data to that the system will provide answers that are relevant to the user's specific domains.

Figure 3:
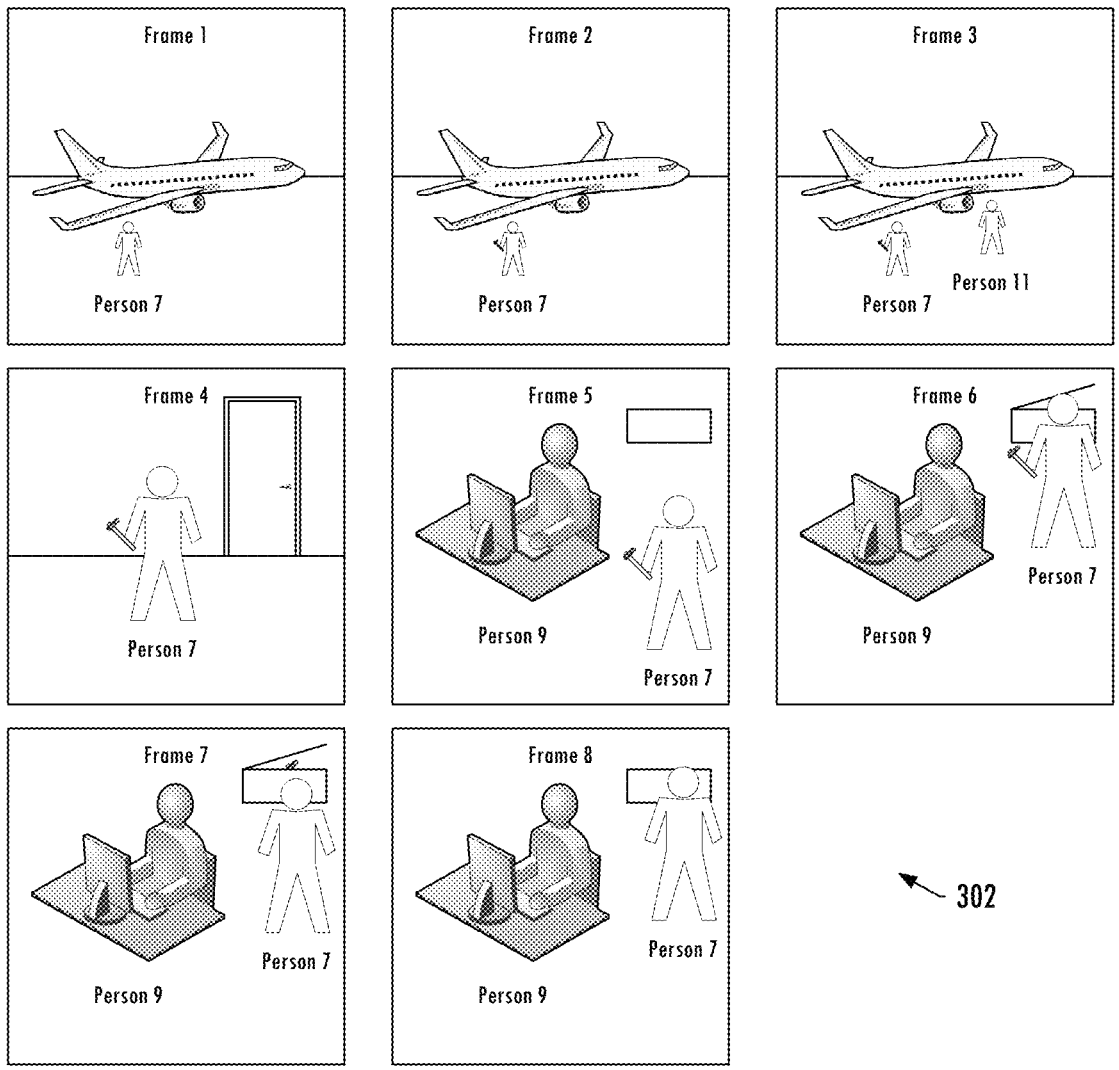
FIG. 3 illustrates a suitable live video feed and corresponding text display, according to some example implementations.

Referring again to FIG. 1, using the plurality of objects and activities identified by the identifier 104, the text generator 106 may then be configured to generate natural language text that describes a storyline of the live video feed, and output the natural language text audibly or visually with a display of the live video feed. FIG. 3 illustrates an exemplary video feed 302 and display 304 with corresponding natural language text that describes the storyline of the live video feed. In some examples, the text generator is configured to filter the natural language text and thereby the storyline to relate only to the object of interest or the activity of interest. In some examples in which the query engine 202 is configured to receive user input that specifies a request for information regarding at least one object or activity of the plurality of objects and activities, and query the database based on the request, the text generator 106 is configured to generate and output for display, natural language text responsive to the request. In some implementations, the text generator is further configured to generate a text log in which the natural language text that describes the storyline or the live video feed, or is more particularly responsive to a user request, is logged into searchable formats for rapid retrieval purposes during subsequent user request.

Figure 4:
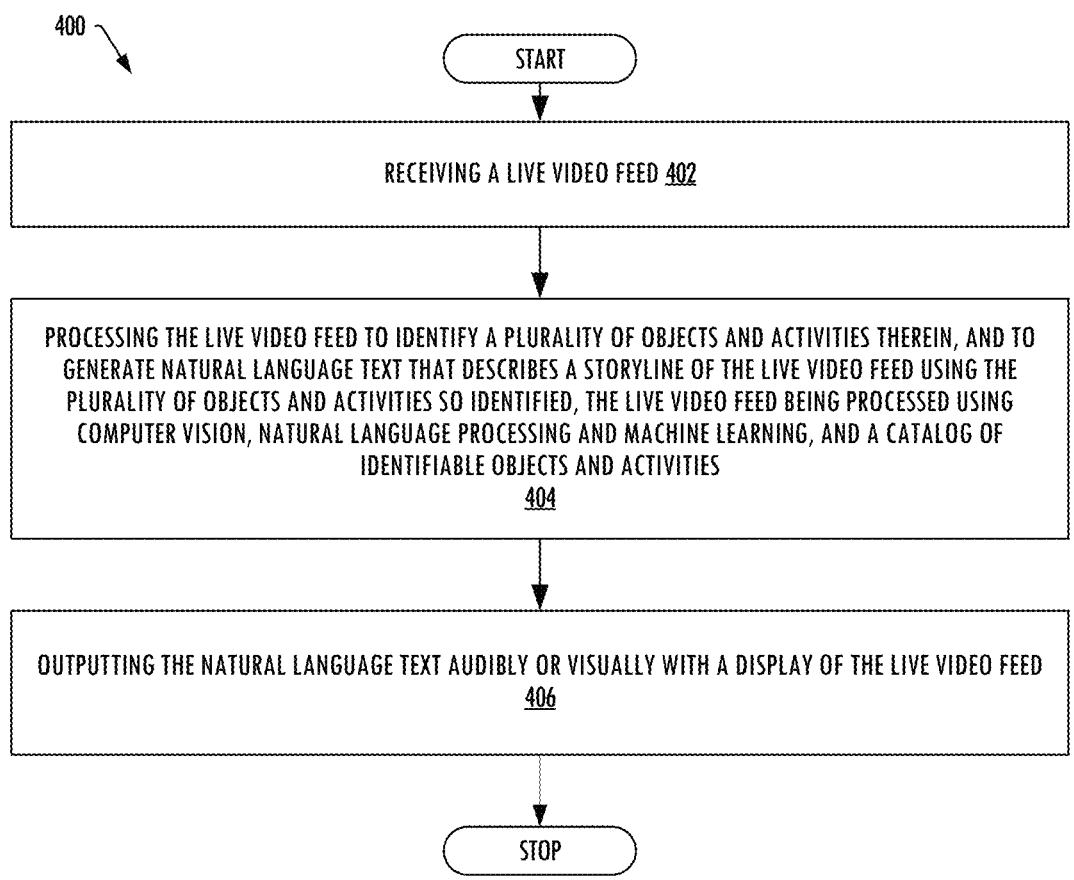
FIG. 4 is a flow diagram illustrating various operations of a method for automated object and activity tracking in a live video feed, in accordance with an example implementation.

FIG. 4 illustrates a flowchart including various operations of a method 400 for automated object and activity tracking in a live video feed. As shown at block 402, the method includes receiving a live video feed. The method also includes processing the live video feed to identify a plurality of objects and activities therein, and to generate natural language text that describes a storyline of the live video feed using the plurality of objects and activities so identified, as shown in block 404. The live video feed is processed using computer vision, natural language processing and machine learning, and a catalog of identifiable objects and activities. The method also includes outputting the natural language text audibly or visually with a display of the live video feed, as shown in block 406.

According to some example implementations of the present disclosure, the system 100 and its subsystems and/or components including the receiver 102, identifier 104 and text generator 106 may be implemented by various means. Similarly, the identifier 200 and its respective subsystems and/or components may be implemented by various means. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 5:
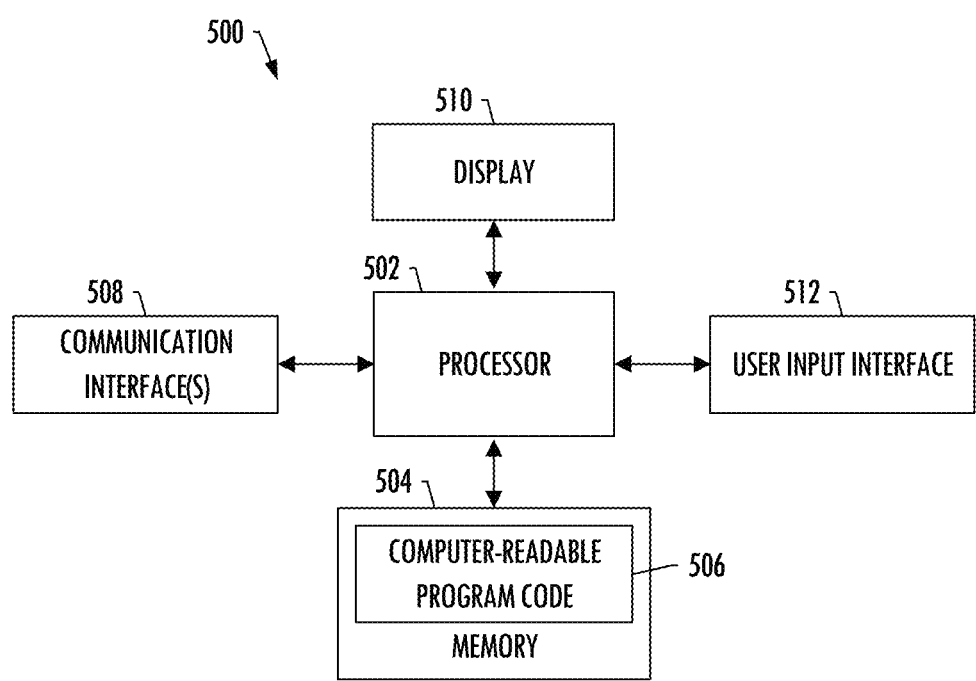
FIG. 5 illustrates an apparatus according to some example implementations.

FIG. 5 illustrates an apparatus 500 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 502 (e.g., processor unit) connected to a memory 504 (e.g., storage device).

The processor 502 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 504 (of the same or another apparatus).

The processor 502 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces 508 for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 510 and/or one or more user input interfaces 512 (e.g., input/output unit). The display may be configured to present or otherwise display information to a user, suitable examples of which include a liquid crystal display (LCD), light-emitting diode display (LED), plasma display panel (PDP) or the like.

The user input interfaces 512 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 500 may include a processor 502 and a computer-readable storage medium or memory 504 coupled to the processor, where the processor is configured to execute computer-readable program code 506 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for automated object and activity tracking in a live video feed, the apparatus comprising a processor and a memory storing executable instructions that, in response to execution by the processor, cause the apparatus to at least:
receive a live video feed;
receive user input specifying an object of interest or an activity of interest;
process the live video feed to identify a plurality of objects and activities therein and to identify the object of interest or the activity of interest in the plurality of objects and activities, and to generate natural language text that describes a storyline of the live video feed using the plurality of objects and activities so identified, wherein the apparatus is trained to process the live video feed using machine learning and a catalog of identifiable objects and activities;
output the natural language text audibly or visually with a display of the live video feed; and
spatiotemporally track the object of interest in the live video feed, or generate an alert to indicate identification of the activity of interest in the live video feed.

2. The apparatus of claim 1, wherein the memory stores further executable instructions that, in response to execution by the processor, cause the apparatus to maintain the catalog of identifiable objects and activities using the machine learning, including the apparatus being caused to update corresponding objects and activities in the catalog with attributes of at least some of the plurality of objects and activities.

3. The apparatus of claim 1, wherein the apparatus that generates the natural language text filters the natural language text and thereby the storyline to relate only to the object of interest or the activity of interest.

4. The apparatus of claim 1, wherein the apparatus that processes the live video feed further includes the apparatus being caused to generate a corresponding database of information describing the plurality of objects and activities, and the memory stores further executable instructions that, in response to execution by the processor, cause the apparatus to at least:
receive user input specifying a request for information regarding at least one object or activity of the plurality of objects and activities; and in response thereto,
query the database based on the request; and
generate and output for display, natural language text responsive to the request.

5. The apparatus of claim 1, wherein the apparatus being caused to process the live video feed to identify the plurality of objects and activities includes being caused to at least:
predict a future outcome of interest based on identification of at least two predefined objects or activities from the plurality of objects and activities; and
generate an alert to indicate the future outcome of interest so predicted.

6. The apparatus of claim 5, wherein the apparatus being caused to predict the future outcome of interest includes being caused to at least identify at least one of the at least two predefined objects or activities within a current frame of the live video, and another of the at least two predefined objects or activities within the current frame or a subsequent frame of the live video.

7. A method for automated object and activity tracking in a live video feed, the method implemented by an apparatus and comprising:
receiving a live video feed;
receiving user input specifying an object of interest or an activity of interest;
processing the live video feed to identify a plurality of objects and activities therein and to identify the object of interest or the activity of interest in the plurality of objects and activities, and to generate natural language text that describes a storyline of the live video feed using the plurality of objects and activities so identified, wherein the apparatus is trained to process the live video feed using machine learning and a catalog of identifiable objects and activities;
outputting the natural language text audibly or visually with a display of the live video feed; and
spatiotemporally tracking the object of interest in the live video feed, or generating an alert to indicate identification of the activity of interest in the live video feed.

8. The method of claim 7 further comprising maintaining the catalog of identifiable objects and activities using the machine learning, including updating corresponding objects and activities in the catalog with attributes of at least some of the plurality of objects and activities.

9. The method of claim 8, wherein generating the natural language text includes filtering the natural language text and thereby the storyline to relate only to the object of interest or the activity of interest.

10. The method of claim 7, wherein processing the live video feed further includes generating a corresponding database of information describing the plurality of objects and activities, and the method further comprising:
receiving user input specifying a request for information regarding at least one object or activity of the plurality of objects and activities; and in response thereto,
querying the database based on the request; and
generating and output for display, natural language text responsive to the request.

11. The method of claim 7, wherein processing the live video feed to identify the plurality of objects and activities includes:
predicting a future outcome of interest based on identification of at least two predefined objects or activities from the plurality of objects and activities; and
generating an alert to indicate the future outcome of interest so predicted.

12. The method of claim 11, wherein predicting the future outcome of interest includes identifying at least one of the at least two predefined objects or activities within a current frame of the live video, and another of the at least two predefined objects or activities within the current frame or a subsequent frame of the live video.

13. A computer-readable storage medium for automated object and activity tracking in a live video feed, the computer-readable storage medium having computer-readable program code stored therein that, in response to execution by a processor, cause an apparatus to at least:
receive a live video feed;
receive user input specifying an object of interest or an activity of interest;
process the live video feed to identify a plurality of objects and activities therein and to identify the object of interest or the activity of interest in the plurality of objects and activities, and to generate natural language text that describes a storyline of the live video feed using the plurality of objects and activities so identified, wherein the apparatus is trained to process the live video feed using machine learning and a catalog of identifiable objects and activities;
output the natural language text audibly or visually with a display of the live video feed; and
spatiotemporally track the object of interest in the live video feed, or generate an alert to indicate identification of the activity of interest in the live video feed.

14. The computer readable storage medium of claim 13 having computer-readable program code stored therein that, in response to execution by a processor, causes the apparatus to further at least maintain the catalog of identifiable objects and activities using the machine learning, including the apparatus being caused to update corresponding objects and activities in the catalog with attributes of at least some of the plurality of objects and activities.

15. The computer readable storage medium of claim 13, wherein the apparatus being caused to generate the natural language text includes being caused to filter the natural language text and thereby the storyline to relate only to the object of interest or the activity of interest.

16. The computer readable storage medium of claim 13, wherein the apparatus being caused to process the live video feed further includes the apparatus being caused to generate a corresponding database of information describing the plurality of objects and activities, and the computer readable storage medium having computer-readable program code stored therein that, in response to execution by a processor, causes the apparatus to further at least:
receive user input specifying a request for information regarding at least one object or activity of the plurality of objects and activities; and in response thereto,
query the database based on the request; and
generate and output for display, natural language text responsive to the request.

17. The computer readable storage medium of claim 13, wherein the apparatus being caused to process the live video feed to identify the plurality of objects and activities includes being caused to at least:
predict a future outcome of interest based on identification of at least two predefined objects or activities from the plurality of objects and activities; and
generate an alert to indicate the future outcome of interest so predicted.

18. The computer readable storage medium of claim 17, wherein the apparatus being caused to predict the future outcome of interest includes being caused to at least identify at least one of the at least two predefined objects or activities within a current frame of the live video, and another of the at least two predefined objects or activities within the current frame or a subsequent frame of the live video.

* * * * *